United States Patent

Giza

[11] Patent Number: 5,158,736
[45] Date of Patent: Oct. 27, 1992

[54] METHOD FOR STRIPPING MOLDED U-SHAPED ARTICLE FROM MOLD

[75] Inventor: John P. Giza, Acushnet, Mass.

[73] Assignee: Acushnet Company, New Bedford, Mass.

[21] Appl. No.: 772,511

[22] Filed: Oct. 7, 1991

Related U.S. Application Data

[60] Continuation of Ser. No. 601,243, Oct. 19, 1990, which is a division of Ser. No. 372,224, Jun. 26, 1989, Pat. No. 4,988,280.

[51] Int. Cl.⁵ .............................................. B28B 7/00
[52] U.S. Cl. ..................................... 264/334; 425/443
[58] Field of Search ..................... 264/334; 425/443

[56] References Cited

U.S. PATENT DOCUMENTS 3,737,272 6/1973 Segmuller ............................ 425/468
4,235,582 11/1980 Holmes ............................... 425/438

Primary Examiner—David A. Simmons
Assistant Examiner—Merrick Dixon
Attorney, Agent, or Firm—Pennie & Edmonds

[57] ABSTRACT

A cavity stripper which is positioned between two mold plates of a mold is used to remove a molded U-shaped article from a cup in one of the mold plates. The cavity stripper is movably attached to the mold plate that houses the cup. The cavity stripper is spring loaded such that it follows the moving mold plate for a short distance and by mechanical interference urges the molded article to remain with the mandrel during opening operations.

12 Claims, 3 Drawing Sheets

1

METHOD FOR STRIPPING MOLDED U-SHAPED ARTICLE FROM MOLD

RELATED APPLICATIONS

This is a continuation of application Ser. No. 07/601,243 filed Oct. 19, 1990 which is a division of application Ser. No. 372,224, filed June 26, 1989, now U.S. Pat. No. 4,988,280.

BACKGROUND OF THE INVENTION

The present invention related to molds and more particularly to an improved apparatus and method for stripping a molded U-shaped article from the mold.

Generally, molded U-shaped articles are formed by using an injection molding machine which comprises a molding unit and an injection unit. The molding unit has a frame on which a mold is mounted and a hydraulic apparatus for opening and closing the mold. The injection unit fluidizes plastic material and injects the fluidized plastic material into the mold.

The mold typically comprises two mold plates. One mold plate houses a plurality of cup molds while the other mold plate has an equal plurality of mandrels which are registered for a respective cup mold. When the mold is closed, one mandrel fits inside one cup mold and a closed cavity is formed. The closed cavity defines the shape of the molded U-shaped article.

Conventionally, a molded U-shaped article is formed by injecting plastic material into the closed cavity of the mold and allowing the plastic material to solidify. The hardened molded article is then removed from the mold by opening the mold.

Typically, the molded U-shaped article is intended to stick on the mandrel when the mold is opened and an ejector is used to push the molded article off of the mandrel once the molded article clears the cup mold. The molded article falls away from the mold due to gravity.

A problem associated with this type of injection molding machine is that the molded article often sticks in the cup mold. When the molded article sticks in the cup mold, either the machine is stopped and an operator physically removes the article or the supply of fluidized plastic material is cut off from that cavity and eventually, when enough cavities become blocked, the machine is shut down and an operator physically removes the stuck articles.

A solution to the sticking problem has been to coat the cup mold with a chemical compound such as a conventional mold release agent. Although this release agent does help, it eventually wears off and the molded articles stick.

SUMMARY OF THE INVENTION

Applicant has discovered an apparatus and method to prevent molded U-shaped articles from sticking in injection molding machines of the type having a mandrel and a cup mold. Specifically, applicant has discovered an apparatus and method for stripping the molded U-shaped articles from the cup mold which virtually eliminate the sticking of molded articles in the cup mold.

The present invention has been proven to provide especially good results in the manufacture of golf ball cover halves.

These and other aspects of the present invention may be more fully understood with reference to the drawings wherein:

DESCRIPTION OF THE PREFERRED EMBODIMENT

Figure 1:
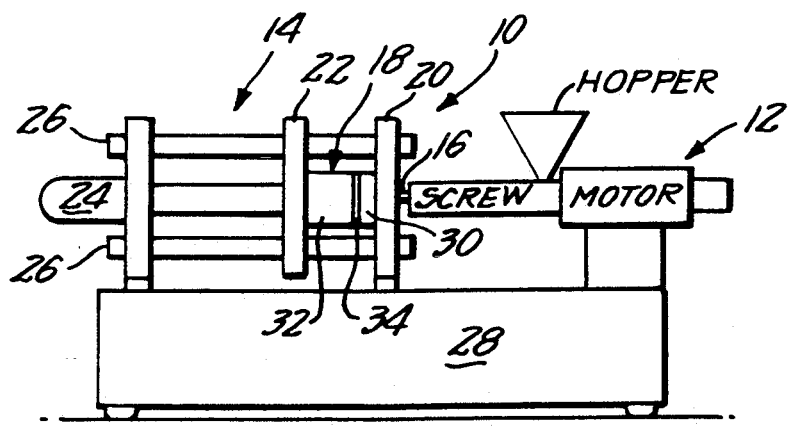
FIG. 1 illustrates an injection molding machine in a closed position employing the present invention.

Referring to FIG. 1, an injection molding machine 10 is shown employing the improved mold of the present invention. Mold machine 10 employs injection unit 12 and molding unit 14. Injection unit 12 feeds fluidized plastic material to nozzle 16 which injects the plastic material into mold 18.

Molding unit 14 comprises mold 18, fixed platen 20 and movable platen 22. Hydraulic cylinder 24 moves platen 22 thereby opening and closing mold 18. Tie rods 26 are used to guide movable platen 22. Both injection unit 12 and molding unit 14 are mounted on base 28.

Mold 18 comprises fixed mold plate 30 which is fixed to platen 20 and movable mold plate 32 which is fixed to movable platen 22. Positioned between fixed mold plate 30 and movable mold plate 32 is cavity stripper plate 34. Cavity stripper plate 34 is movably fixed to fixed mold plate 30. Although not shown, it is to be understood that fixed mold plate 30 houses a plurality of cup molds and that movable mold plate 32 houses a plurality of mandrels which are registered with the cup molds.

Figure 2:
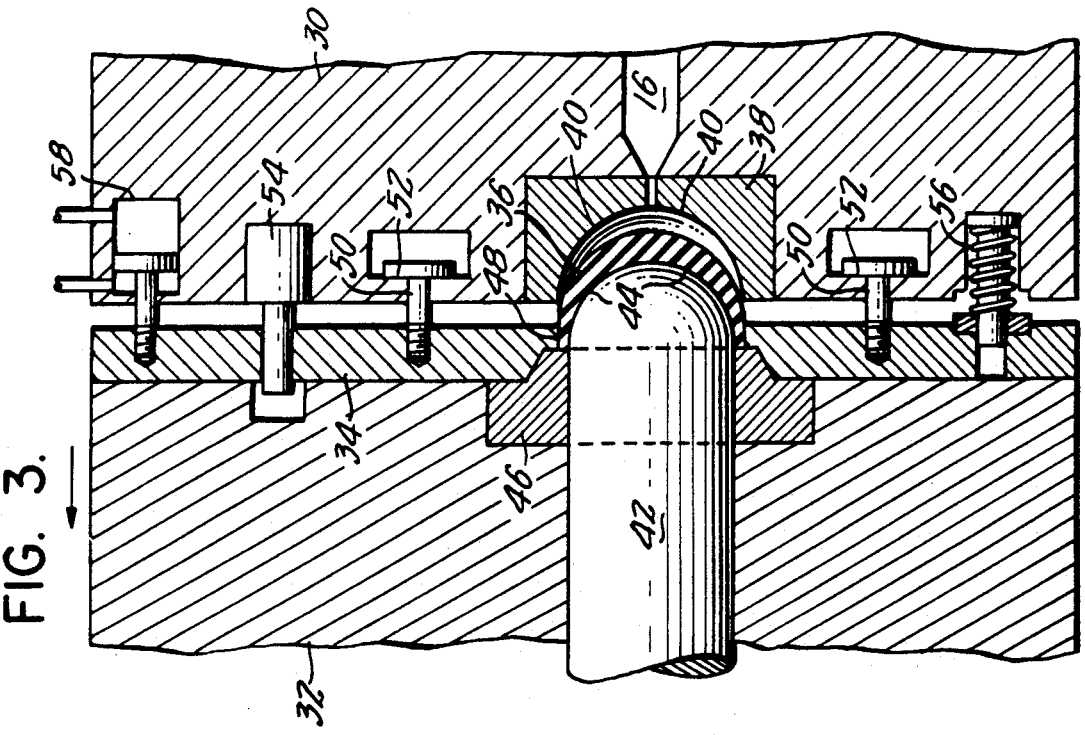
FIG. 2 is a cross sectional view through a closed mold employing the present invention.

FIG. 2 is a cross-sectional view of mold 18 through a single closed cavity. Nozzle 16 extends into fixed mold plate 30 such that it can inject the closed cavity with fluidized plastic material. The closed cavity is shown with molded U-shaped article 36 therein.

Cup mold 38 is fixed inside mold plate 30. Effective cup mold inner surface 40 defines a portion of the boundary of the closed cavity in which molded U-shaped article 36 is formed. Mandrel 42 is fixed on movable mold plate 32 and effective mandrel outer surface 44 defines another portion of the boundary of the closed cavity in which molded U-shaped article 36 is formed. Ejector 46 is movably fixed in movable mold plate 32. Ejector 46 operates in a conventional manner to push molded U-shaped article 36 off of mandrel 42 when mold 18 is opened and once molded U-shaped article 36 is clear of cup mold 38 and cavity stripper plate 34. A bore through cavity stripper plate 34 is in registration with cup mold 38 and mandrel 42 such that bore wall 48 also defines a portion of the boundary of the closed cavity in which molded U-shaped article 36 is formed.

Cavity stripper plate 34 is movably attached to fixed mold plate 30 by means of bolts 50. Heads 52 of bolts 50 ensure that cavity stripper plate 34 moves a set distance from fixed mold plate 30. Good results are obtained when the distance that cavity stripper plate 34 moves from fixed mold plate 30 is about 0.5 cm. Guide pin 54 is used to aid in aligning cavity stripper plate 34 during its movements.

To urge cavity stripper plate 34 away from fixed mold plate 30, compression spring means 56 is positioned in fixed mold plate 30 and applies a force against cavity stripper plate 34 such that when mold 18 is opened, cavity stripper plate 34 is forced to move away from fixed mold plate 30 until the movement of cavity stripper plate 34 is halted by bolts 50. Any compression spring means can be used, such as a compression-type helical spring or a hydraulic means, which is coordinated to push cavity stripper plate 34 away from fixed mold plate 30 for a fixed distance at the same time as mold 18 is opened and movable mold plate 32 moves away from fixed mold plate 30. Good results are obtained with a Bellville spring that provides about 1900 pounds of pressure to cavity stripper plate 34. Thus, cavity stripper plate 34 follows movable mold plate 32 a short distance upon initial opening of the mold and is then halted by bolts 50.

When closing mold 18, good results are obtained by first joining cavity stripper plate 34 to fixed mold plate 30 and then moving movable mold plate 32 to fully close mold 18 and form a closed cavity.

In order to join cavity stripper plate 34 to fixed mold plate 30, conventional mechanical means 58 is employed. Mechanical means 58 is a conventional hydraulic cylinder arrangement.

The surface area of bore wall 48 is less than the surface area of effective mandrel outer surface 44 and preferably the surface area of bore wall 48 is about one half the size of the surface area of effective mandrel outer surface 44. Good results are obtained with bore wall 48 having a surface area about one fourth that of the surface area of effective mandrel outer surface 44.

Figure 3:
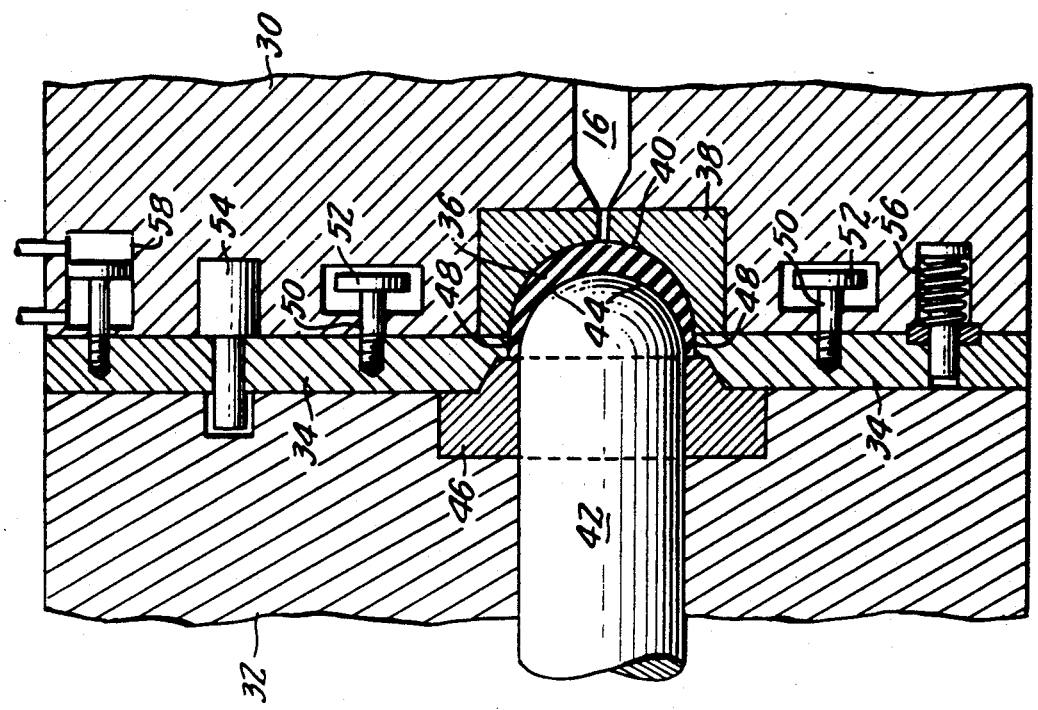
FIG. 3 is a cross-sectional view through the mold of FIG. 2 wherein the mold is partially open.

The method of operation of the present invention will now be described with reference to FIGS. 3 and 4. FIG. 3 illustrates a portion of mold 18 just as it starts to open. Compression spring means 56 urges cavity stripper plate 34 to follow movable mold plate 32 as it moves away from fixed mold plate 30. At this point in time, cavity stripper plate 34 abuts movable mold plate 32 and has moved away from fixed mold plate 30.

Due to the mechanical interference exerted by bore wall 48 on molded U-shaped article 36 during opening of mold 18, molded U-shaped article 36 sticks to mandrel 42 and not to cup mold 38. The distance which cavity stripper plate 34 moves in abutment with movable mold plate 32 is such that molded U-shaped article 36 is broken loose from cup mold 38.

Figure 4:
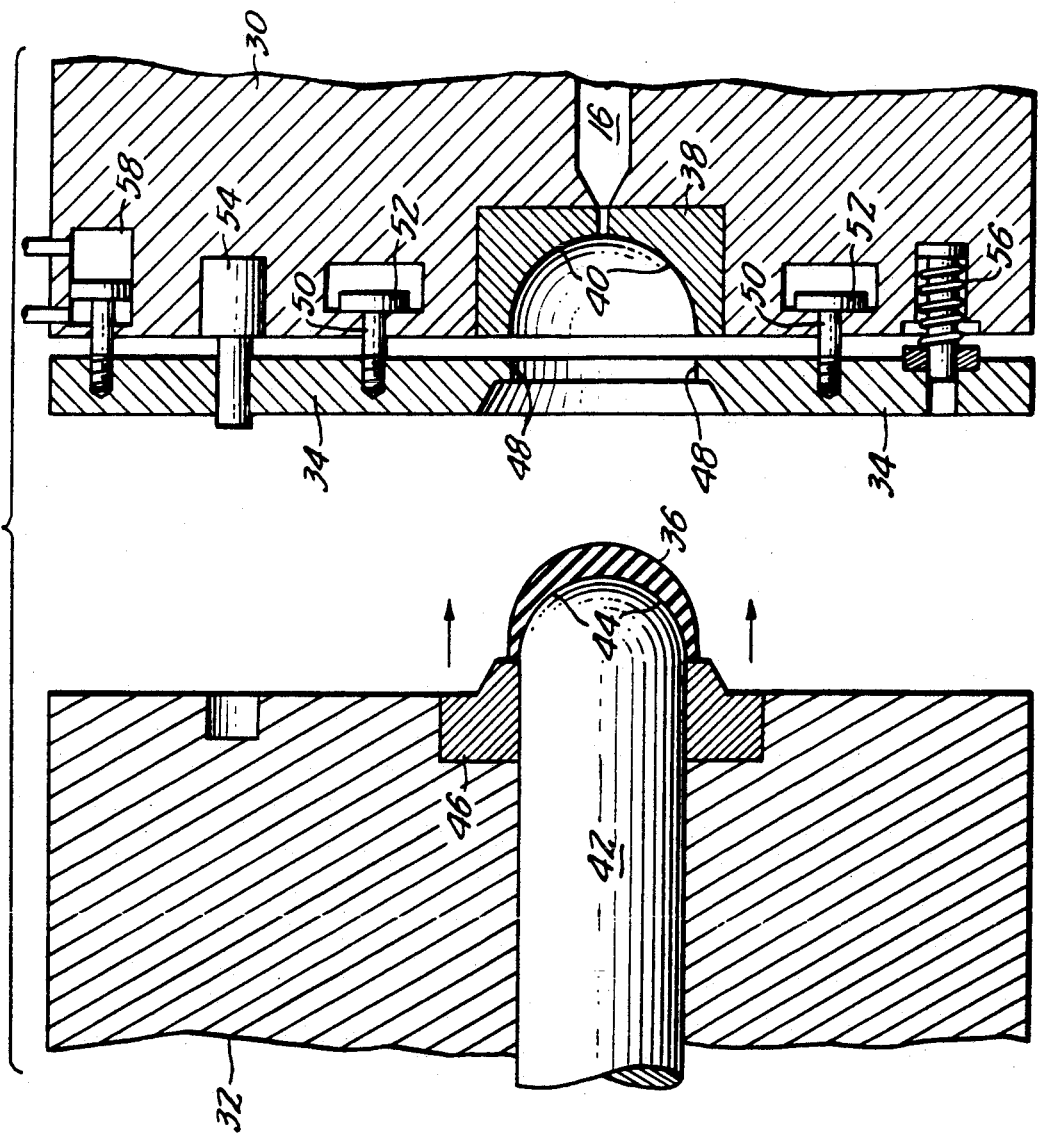
FIG. 4 is a cross-sectional view through the mold of FIG. 3 wherein the mold is in an open position.

FIG. 4 illustrates the portion of mold 18 shown in FIG. 3 at a point in time subsequent to that shown in FIG. 3. Movable mold plate 32 is still moving away from fixed mold plate 30. In FIG. 4 cavity stripper plate 34 is not moving. In order to remove molded U-shaped article 36 from mandrel 42, ejector 46 pushes molded U-shaped article off of mandrel 42 and, due to the force of gravity, molded U-shaped article 36 falls free of mold 18. Once mandrel 42 is clear, mold 18 is closed and fluidized plastic material is injected into the closed cavity formed by mandrel 42, cavity stripper plate 34 and cup mold 38.

Figure 5:
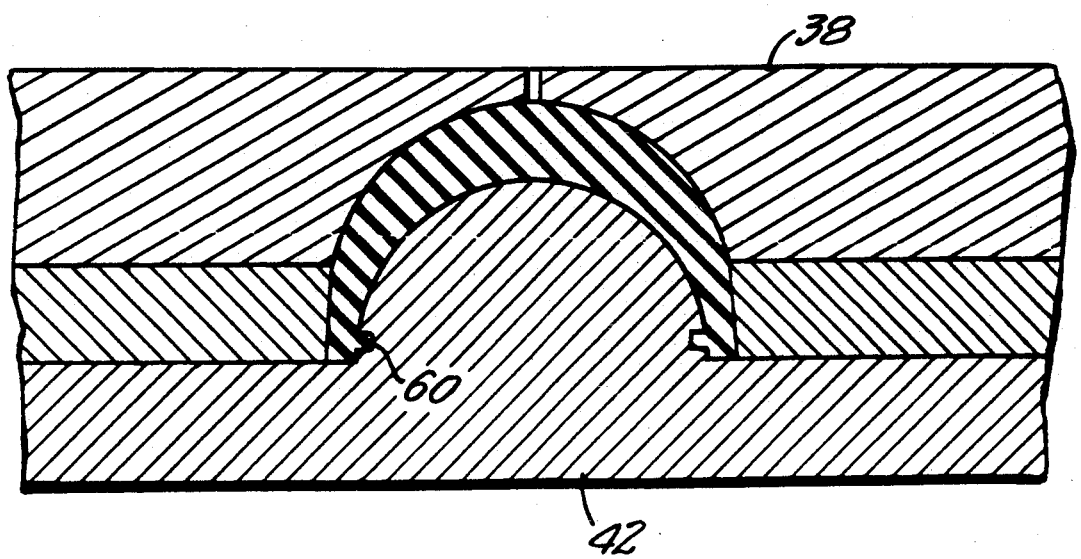
FIG. 5 is an alternative mandrel configuration.

To assist cavity stripper plate 34 to strip molded U-shaped article 36 from cup mold 38, mandrel 42 can be tapered at the base where the ejector 46 meets mandrel 42. This tapering aspect of mandrel 42 is conventional. Alternatively or additionally, the base of mandrel 42 is groove 60 to assist in stripping molded U-shaped article 36 from cup mold 38. FIG. 5 illustrates mandrel 42 with groove 60. Preferably, mandrel 42 has groove 60.

Cavity stripper plate 34 is illustrated as a plate having a bore therethrough that is in registration with mandrel 42 and cup mold 38. Cavity stripper plate 34 can also be an individual ring which is in registration with cup mold 38 and mandrel 42. In the employment of such cavity stripping rings, the number of rings equals the number of mandrels and cup molds. Alternatively, cavity stripper plate 34 can comprise diametrically opposed hands that partially encircle the base of molded U-shaped article 36. Thus, instead of a closed ring, these hands merely apply a mechanical interference to a portion of the base of the molded article.

The present invention discloses cup mold 38 affixed to and cavity stripper plate 34 movably affixed to fixed mold plate 30 and mandrel 42 affixed to movable mold plate 32. Obviously, mandrel 42 could be fixed to fixed mold plate 30 and cup mold 38 and cavity stripper plate 34 could be part of movable mold plate 32. In such a case, the present invention would function in the same manner except the direction of movement would change with respect to the plates 30, 32 and 34.

It will be understood that the claims are intended to cover all changes and modifications of the preferred embodiments of the invention, herein chosen for the purpose of illustration, which do not constitute a departure from the spirit and scope of the invention.

I claim:

1. A method for stripping a molded U-shaped article having exterior walls substantially without exterior projections from a mold cup in an injection molding machine having a first mold plate and a second mold plate, said first mold plate having a cup mold affixed therein, said second mold plate having a mandrel fixed thereon, said cup mold in registration with said mandrel and a movable stripper plate, comprising the steps of:

(a) applying a mechanical interference on the base of said U-shaped article with the stripper plate when said article is in said mold, said mechanical interference being tangential to the exterior walls of said U-shaped article, said application of said mechanical interference being of sufficient force to cause said molded U-shaped article to remain on said mandrel while said molded U-shaped article is removed from said mold cup; and (b) releasing said mechanical interference from the base of said molded U-shaped article through stripper plate movement when said article is no longer in contact with said mold cup and while said article is still housed on said mandrel.

2. The method of claim 1 wherein said mechanical interference is applied to said molded U-shaped article by means of a cavity stripper member affixed to said first mold plate.

3. The method of claim 2 wherein said mechanical interference is applied by means of a bore in said cavity stripper member, said bore having a substantially smooth wall.

4. The method of claim 3 wherein said mandrel has an outer surface, and said cup mold has an inner surface, and said bore, said mandrel outer surface and said cup mold inner surface substantially define the closed cavity in which said molded U-shaped article is formed.

5. The method of claim 4 wherein said mechanical interference applied by said bore is applied over an area on said molded U-shaped article that is less than half the mandrel outer surface.

6. The method of claim 1 further comprising removing said molded U-shaped article off of said mandrel.

7. The method of claim 2 wherein said mechanical interference is applied by means of a bore in said cavity stripper member, said bore having a completely smooth wall.

8. A method for stripping a molded golf ball cover shell half from a mold cup in an injection molding machine having a first mold plate and a second mold plate, said first mold plate having a cup mold affixed therein, said cup mold substantially corresponding in shape to the outside of a golf ball cover shell hair, said second mold plate having a mandrel fixed thereon, said cup mold in registration with said mandrel, and a movable stripper plate comprising the steps of:
 (a) applying a mechanical interference to the base of said molded golf ball cover shell half using the stripper plate when said molded golf ball cover shell half is in said mold, said mechanical interference being tangential to the exterior walls of said golf ball cover shell half, said application of said mechanical interference being of sufficient force to cause said molded golf ball cover shell half to remain on said mandrel while said molded golf ball cover shell half is removed from said mold cup; and
 (b) releasing said mechanical interference form the base of said molded golf ball cover shell half through stripper plate movement when said cover shell half is no longer in contact with said mold cup while said molded golf ball cover shell half is still housed on said mandrel.

9. The method of claim 8 wherein said first mold plate has a cavity stripper member therein and said mechanical interference is applied to said molded golf ball cover shell half by means of a bore in said cavity stripper member, said bore having a substantially or completely smooth wall.

10. The method of claim 9 wherein said mandrel has an outer surface and said cup mold has an inner surface, and said bore, said mandrel outer surface, and said cup mold inner surface substantially define the closed cavity in which said molded golf ball cover shell half is formed.

11. The method of claim 8 further comprising removing said molded golf ball cover shell half off of said mandrel.

12. A method for stripping a molded U-shaped article from a mold cup in an injection molding machine of the type having two mold plates, a first mold plate having a mandrel affixed thereto and a second mold plate having a cup mold affixed therein, said mandrel in registration with said mold cup, said molded U-shaped article formed in a closed cavity between said mandrel and said cup mold, said method comprising
 (a) applying a mechanical interference to the base of said molded U-shaped article while said article is in said mold; and
 (b) releasing said mechanical interference from the base of said molded U-shaped article when said molded U-shaped article is no longer in contact with said mold cup and while said molded U-shaped article is still housed on said mandrel.

* * * * *